UNITED STATES PATENT OFFICE.

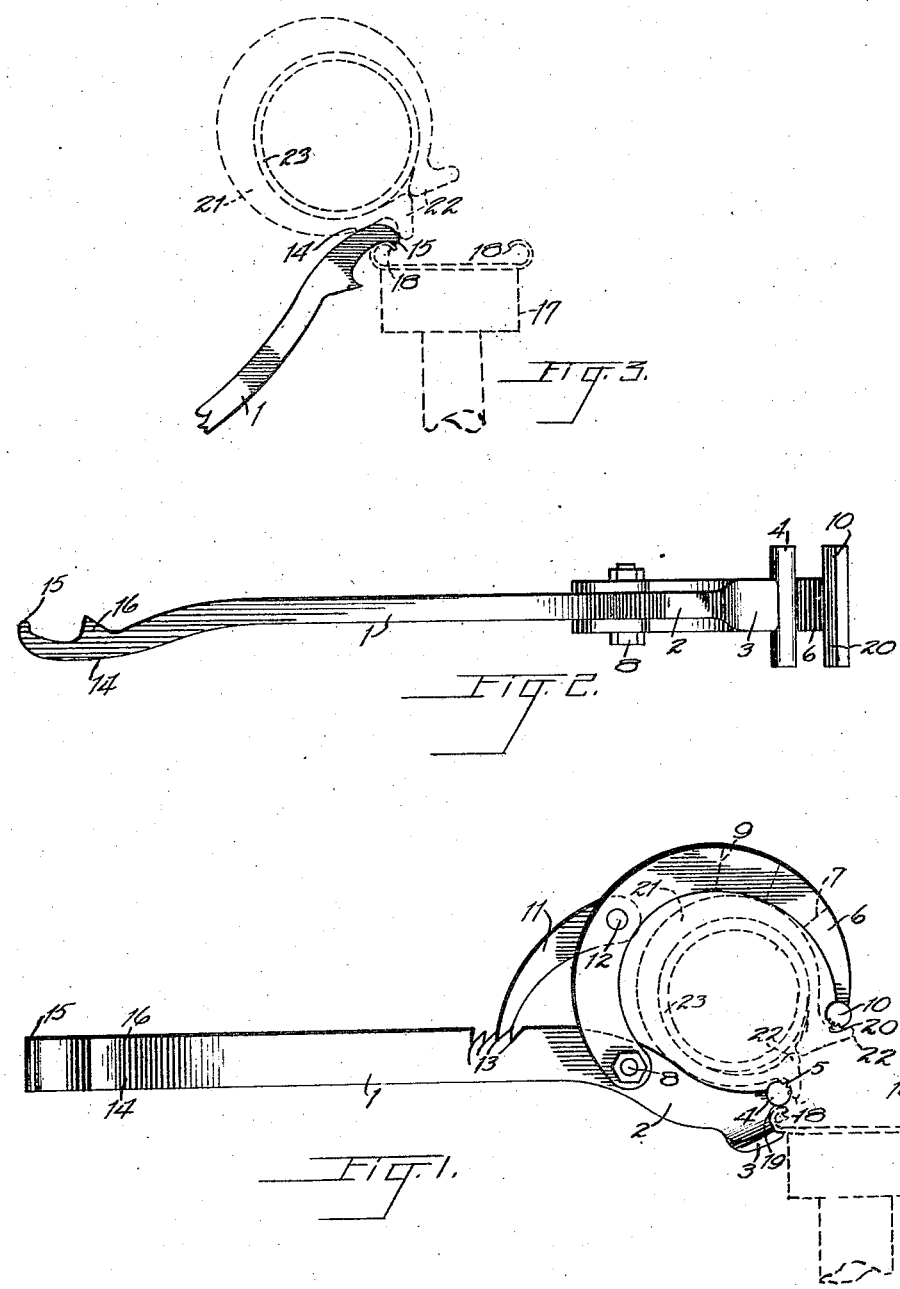

FRANCAIS E. WAFER, OF CHICAGO, ILLINOIS.

CLINCHER-TIRE REMOVER AND REPLACER.

1,414,908.

Specification of Letters Patent.   Patented May 2, 1922.

Application filed August 20, 1920. Serial No. 404,886.

*To all whom it may concern:*

Be it known that I, FRANCAIS E. WAFER, a citizen of United States, and a resident of Chicago, in the county of Cook and State of Illinois, have invented a new and useful Improvement in Clincher-Tire Removers and Replacers, of which the following is a full, clear, and exact description.

My invention relates to improvements in clincher tire remover and replacer, and it consists in the combinations, constructions, and arrangements herein described and claimed.

An object of my invention is to provide a device designed to be used in removing and replacing clincher tires and having means for engaging such a tire to permit the same being removed from the rim of a wheel by a single motion.

A further object of my invention is to provide a device of the type described adapted to be used in accomplishing the removel of the tire without injuring the inner tube.

A further object of my invention is to provide a device of the type described that is simple in construction, durable, and effective in operation.

A further object of my invention is to provide a device of the type described that can be manufactured cheaply and is thoroughly practical commercially.

Other objects and advantages will appear in the following specification, and the novel features of the invention will be particularly pointed out in the appended claims.

My invention is illustrated in the accompanying drawings, forming part of this application, in which—

Fig. 1 is a view showing the use and operation of my improved device,

Fig. 2 is a view of the device,

Fig. 3 is a view showing another use of the device.

In carrying out my invention, I provide a handle 1 having its inner end formed into a curved tong member 2. The end of the curved tong member 2 is provided with an integral jaw piece 4 extending at right angles thereto and projecting at both sides thereof. To the rear of the jaw piece 4 is a boss or head 3 which projects, as shown, thereby defining a curved recess 19. The jaw piece 4 has its inner side serrated at 5 in order to grip the work engaged. A second tong member 6 formed as shown is fashioned with a longitudinal slot 7. The handle 1 is disposed within the slot 7 and the tong member 6 is pivoted to the tong member 2 by means of a bolt 8, or the like. The end of the tong member 2 is formed with a jaw piece 10 that is similar to the jaw piece 4. The jaw piece 10 has its side facing the jaw piece 4 serrated at 20 to grip the work engaged. A strengthening block 9 may be provided, as shown, being formed integrally with the slotted portion of the tong member 6.

A pawl 11 pivoted at 12 in the slot 7 engages with teeth 13 in the handle 1 to maintain the tong member 6 in a desired position with respect to the tong member 2. The outer end of the handle 1 is fashioned with a laterally bent portion 14 terminating in a curved finger 15 and having a lateral projection or heel 16, as best seen in Fig. 2.

From the foregoing description of the various parts of the device, the operation thereof may be readily understood. The jaw pieces 10 and 4 are adapted to engage opposite sides of a clincher tire 21 adjacent the beaded flanges 22 which are mounted on the outer rim 18 carried by the felly 17 of a wheel. The side of the outer rim 18 is received within the curved recess 19 in the head 3 which serves as a fulcrum for the handle 1. The handle 1 is then swung at right angles to the rim 18 and the tire 22 is removed therefrom in a single motion without injuring the inner tube 23, which is untouched.

An intermediate position of the tire 21 during the operation described is pictured in Fig. 1 of the drawings. The outer end of the handle 1 is utilized in replacing the tire on the outer rim 18. A portion of the tire 21 is placed in position on the outer rim 18. The end 14 of the device is then inserted between the beaded flange 22 of the tire casing and the adjacent edge of the outer rim 18. The handle 1 is then swung at right angles to the direction of the outer rim 18 and the clincher tire 21 is moved into position upon the outer rim 18. In the event difficulty is encountered in replacing the final portion of the tire 21 upon the outer rim 18, the tong members 6 and 2 may be utilized to accomplish this object quickly, the operation being the reverse that described in accomplishing the removal of a tire.

If the beads 22 of the tire 21 have become "frozen" under the flanges of the rim 18, the device can be placed over the tire 21 as shown in Figure 1. A movement of the handle 1 in a counter-clockwise direction with the flange 18 as a pivot point, causes the jaw piece 10 to grip the tire 21 adjacent the bead 22 and to force the latter inwardly away from the flange 18. This same movement also causes the tong member 6 to move in a clockwise direction with respect to the handle 1. As the member 6 swings in a clockwise direction around the bolt 8, the pawl 11 will travel down the teeth 13 and will lock the member 6 from movement in a reverse direction when the handle 1 has come to the end of its movement. Since the jaws 4 and 10 are locked in position, the bead 22 will be held withdrawn from the flange 18 when the handle 1 is swung in a clockwise direction. This movement will free the other bead 22 from its flange 18, whereupon the tire can be removed.

I claim:

1. A tool of the character described comprising a handle having a plurality of teeth fashioned therein and having one end formed into a curved tong member, said tong member being provided at its end with a jaw piece disposed at right angles thereto, and with a projecting head extending laterally therefrom, the outer side of said head being curved inwardly, a second tong member curved to conform with the contour of a tire and pivoted at one end to the handle in position to cooperate with said first named tong member, said second named tong member being formed with a jaw piece disposed at right angles thereto and arranged to face said first named jaw piece, and means for preventing an opening movement of said second named tong member about its pivot, said means comprising a pawl carried by said second tong member and being adapted to engage with the teeth of said handle.

2. A tool of the character described comprising a handle having one end formed into a curved tong member, said tong member being provided at its end with a jaw piece disposed at right angles thereto, and with a projecting head extending laterally therefrom, the outer side of said head being curved inwardly, a second tong member curved to conform with the contour of a tire and pivoted at one end to the handle in position to cooperate with said first named tong member, said second named tong member being formed with a jaw piece disposed at right angles thereto and arranged to face said first named jaw piece, and means for preventing the opening movement of the jaws at the limit of the closing movement produced by the swinging of the handle.

FRANCAIS E. WAFER.